United States Patent
Swenson et al.

(10) Patent No.: US 11,714,911 B2
(45) Date of Patent: Aug. 1, 2023

(54) SECURING DATA IN MULTITENANT ENVIRONMENT

(71) Applicant: Twilio Inc., San Francisco, CA (US)

(72) Inventors: Christopher Swenson, Portland, OR (US); Umair Akeel, San Ramon, CA (US); Nicolas Acosta Amador, San Francisco, CA (US); Byeongung Ahn, East Palo Alto, CA (US); Liat Dremer, Belmont, CA (US)

(73) Assignee: Twilio Inc., San Francisco, CA (US)

( * ) Notice: Subject to any disclaimer, the term of this patent is extended or adjusted under 35 U.S.C. 154(b) by 112 days.

(21) Appl. No.: 17/114,318

(22) Filed: Dec. 7, 2020

(65) Prior Publication Data
US 2022/0179973 A1 Jun. 9, 2022

(51) Int. Cl.
| | |
|---|---|
| G06F 21/60 | (2013.01) |
| G06F 16/22 | (2019.01) |
| H04L 9/08 | (2006.01) |
| H04L 9/32 | (2006.01) |

(52) U.S. Cl.
CPC ............ G06F 21/602 (2013.01); G06F 16/22 (2019.01); H04L 9/0838 (2013.01); H04L 9/32 (2013.01)

(58) Field of Classification Search
CPC ..... G06F 21/602; G06F 16/22; H04L 9/0838; H04L 9/32
See application file for complete search history.

(56) References Cited

U.S. PATENT DOCUMENTS

| | | | |
|---|---|---|---|
| 10,235,335 B1 | 3/2019 | Speers et al. | |
| 10,503,730 B1 | 12/2019 | Speers et al. | |
| 10,740,474 B1 | 8/2020 | Ghetti et al. | |
| 2005/0050344 A1* | 3/2005 | Hull | H04L 65/762 713/193 |
| 2016/0299924 A1* | 10/2016 | Fujimoto | G06F 21/6227 |
| 2017/0249425 A1* | 8/2017 | Narayanaswamy | G06F 9/451 |
| 2017/0262546 A1* | 9/2017 | Chen | G06F 16/9535 |
| 2018/0144152 A1* | 5/2018 | Greatwood | G06F 21/602 |
| 2019/0220620 A1* | 7/2019 | Hahn | G06F 21/602 |

(Continued)

OTHER PUBLICATIONS

Burns, Jonathan, "Systems and Methods for Filter Conversion", U.S. Appl. No. 62/502,731, Application Filed May 7, 2017, 22 pgs.

(Continued)

*Primary Examiner* — Noura Zoubair
*Assistant Examiner* — Zoha Piyadehghibi Tafaghodi
(74) *Attorney, Agent, or Firm* — Schwegman Lundberg & Woessner, P.A.

(57) ABSTRACT

Methods, systems, and computer programs are presented for secure data encryption in a multi-tenant service platform. One method includes an operation for detecting a write request to write index data to storage. The write request is from a first user from a group of users, and the storage is configured to store index data for the group of users. Further, the method includes operations for authenticating that the first user is approved for access to the storage, and for identifying a first encryption key for the first user, where each user from the group of users has a separate encryption key. Further yet, the method includes encrypting the index data with the first encryption key and storing the encrypted index data in the storage.

15 Claims, 8 Drawing Sheets

(56) References Cited

U.S. PATENT DOCUMENTS

2019/0340381 A1* 11/2019 Yavuz .................. G06F 16/13
2019/0384931 A1* 12/2019 Lahav .................. G06F 21/64
2020/0202034 A1* 6/2020 Gaijar ................ G06F 21/6272

OTHER PUBLICATIONS

Burns, Jonathan Thomas, "Systems and Methods for Filter Conversion", U.S. Appl. No. 15/973,027, Application filed May 7, 2018, 39 pgs.

Ghetti, Adam, "Systems and Methods for Generation of Secure Indexes for Cryptographically-Secure Queries", U.S. Appl. No. 62/502,732, Application filed May 7, 2017, 28 pgs.

Ghetti, Adam, "Systems and Methods for Generation of Secure Indexes for Cryptographically-Secure Queries", U.S. Appl. No. 16/930,502, Application filed Jul. 16, 2020, 44 pgs.

Speers, Ryan Mark, "Systems and Methods for Cryptographically-Secure Queries Using Filters Generated By Mlultiple Parties", U.S. Appl. No. 16/682,336, Application filed Nov. 13, 2019, 72 pgs.

Speers, Ryan, "Systems and Methods for Cryptographically-Secure Queries Using Filters Generated By Multiple Parties", U.S. Appl. No. 62/271,830, Application filed Dec. 28, 2015, 59 pgs.

\* cited by examiner

SECURING DATA IN MULTITENANT ENVIRONMENT

TECHNICAL FIELD

The subject matter disclosed herein generally relates to methods, systems, and machine-readable storage media for securing data.

BACKGROUND

Many companies record a large number of voice support calls. For many reasons, such as for audit purposes or to improve business processes, the support calls are transcribed to text logs in order to facilitate searching of data within the support calls. However, the row transcripts of the conversations are difficult to search, such as to determine if an operator gave her name or to evaluate if the customer was satisfied with the call.

The transcript data is often critical, so it is often encrypted before saving to permanent storage. Typical search tools do not work with encrypted data so new tools are needed for searching the encrypted transcripts.

In multi-tenant operation centers, the data from multiple clients may be stored in the same database. Measures must be put in place to ensure that clients cannot access the data from other clients.

What is needed are tools that provide powerful search capabilities of voice transcripts while protecting the confidentiality of data in multi-tenant environments.

SUMMARY

A communications service provider provides services to support customer centers for companies to interact with their customers. The interactions with customer include conversations that are sometimes recorded, transcribed to text, encrypted, and saved in a database. To facilitate searches of the conversations, an index is created for the transcripts. To protect each client's data, the index data for each user is kept in a separate index, which is stored in a separate area of the database, such as in a folder of a file system. The index data is encrypted with a separate key for each client in order to protect the index data, such that each client can only access its own index data.

One general aspect includes a method that includes an operation for detecting a write request to write index data to storage. The write request is from a first user from a group of users, and the storage is configured to store index data for the group of users. Further, the method includes operations for authenticating that the first user is approved for access to the storage, and for identifying a first encryption key for the first user, where each user from the group of users has a separate encryption key. Further yet, the method includes encrypting the index data with the first encryption key and storing the encrypted index data in the storage.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to secure data encryption in a multi-tenant service platform. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
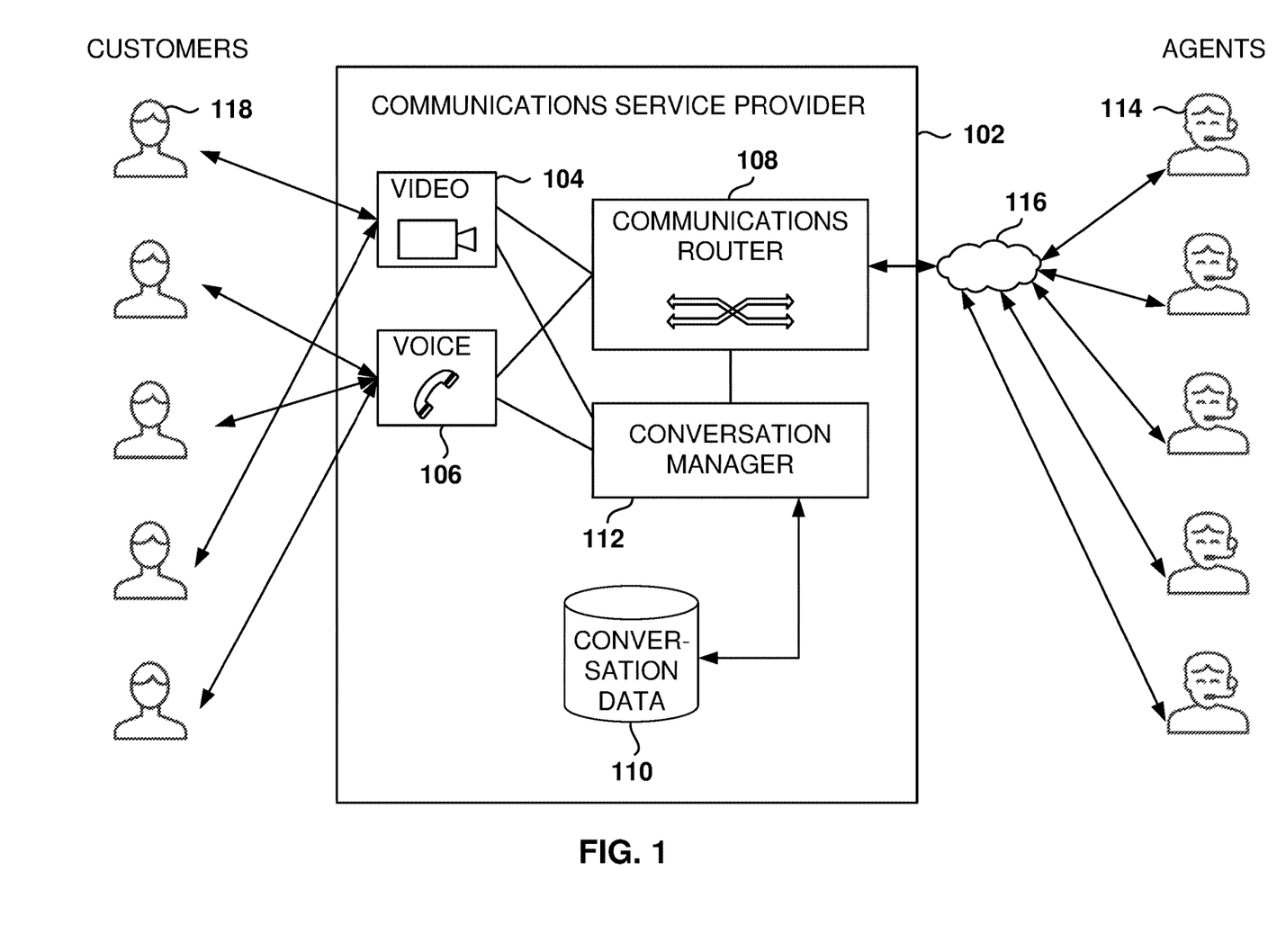
FIG. 1 shows an architecture of a communications service provider that provides call center services, according to some example embodiments.

FIG. 1 shows an architecture of a communications service provider 102 that provides call center services, according to some example embodiments. In some example embodiments, a communications service provider 102 provides call-center services to facilitate voice and data communications between customers 118 and agents 114.

The agents 114 may work for a plurality of companies that use the services of the communications service provider 102. The customers 118 may establish video and voice conversations to communicate with the agents 114, such as for requesting support for a product or service, utilizing client devices that interact with customer devices. During a support session, the client devices establish a communications session, also referred to herein as a conversation, with the customer devices, and the communications session allows the client devices to communicate with the customer devices by sharing any of text, audio, video, files, etc. As used herein, a conversation refers to a series of communication exchanges between two entities, where the communication exchanges occur close in time (e.g., the conversation includes interaction taking place within a fifteen minute window, although other time periods are possible, such as in the range from 30 seconds to thirty minutes). The communication exchange includes exchanging one or more of text messages, audio, video, documents, files, etc.

The customers 118 and agents 114 communicate with the communications service provider 102 via direct connections or through a network 116, such as the Internet or a private network connection.

When a customer 118 requests a video or voice communication with the company, the communications service provider 102 routes the video or voice communications to one of the agents 114 from that company. When an agent 114 initiates the call, the conversation manager 112 routes the call to the customer 118.

During the conversation, a conversation manager 112 records the conversations (e.g., voice data) in a conversation database 110 of the communications service provider 102. For example, the conversation manager 112 records audio data transmitted as part of communications sessions established between the client device of the customer 118 and the customer device used by the agent 114.

Additionally, the communications service provider 102 includes a video processor 104 that processes video calls, a voice processor 106 that processes voice calls, and a communications router 108 that routes the communication data between customers 118 and agents 114.

The conversation manager 112 manages the conversations, such as to establish, monitor, and terminate conversations, as well as managing the storage of conversation data when requested by the client of the communications service provider 102, e.g., to review conversations of the agents 114 performing work for the client.

The clients may use the conversation data to manage, monitor, and improve operations, such as to monitor for compliance by an agent or to determine when a follow-up call is requested to further a sales process. In some example embodiments, for security reasons, the data stored in the conversation database 110 is encrypted, and tools for searching encrypted data are provided.

Figure 2:
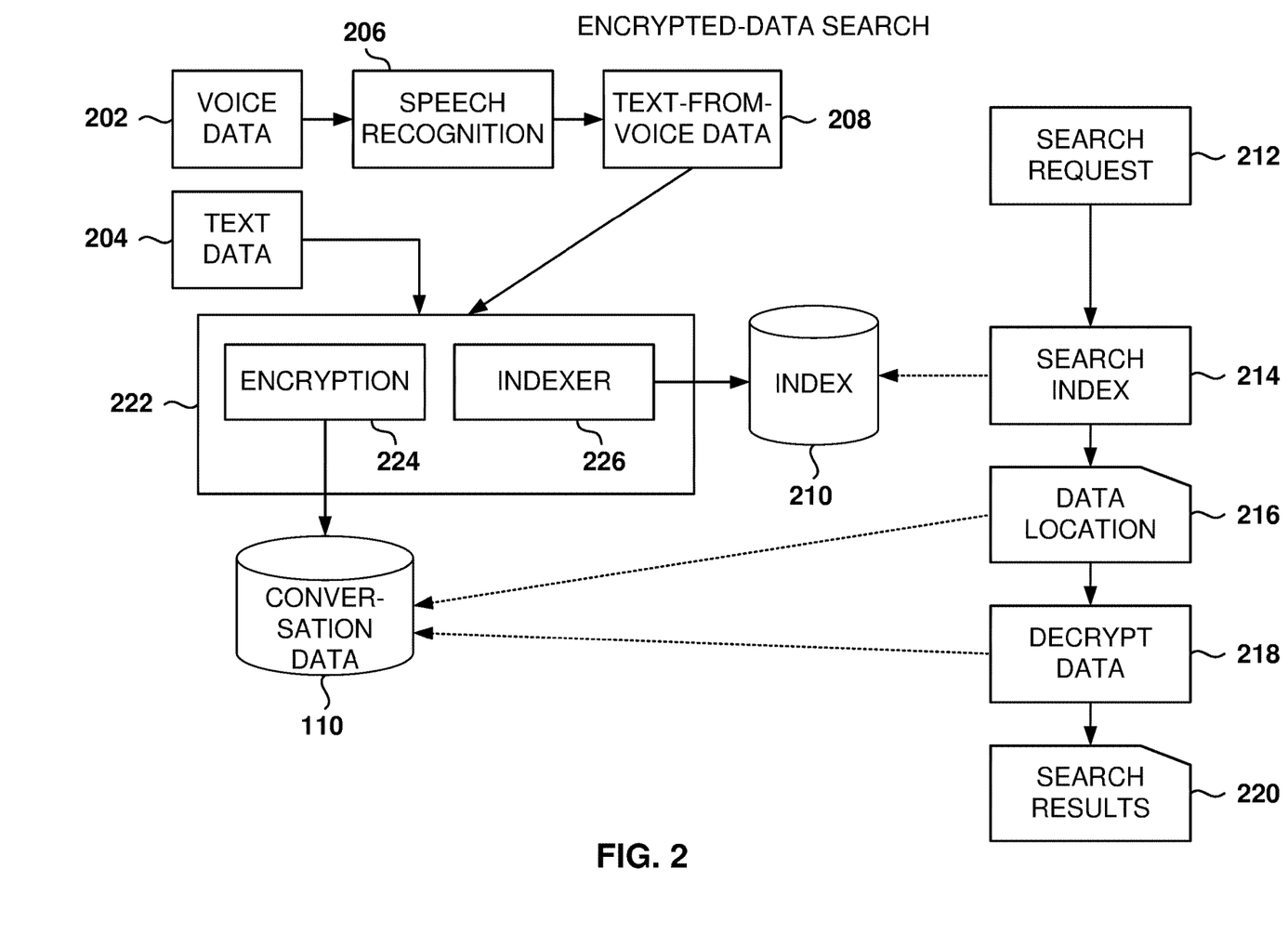
FIG. 2 illustrates a system for searching encrypted data, according to some example embodiments.

FIG. 2 illustrates a system for searching encrypted data, according to some example embodiments. Voice data 202 from conversations is analyzed by a speech recognition program 206 that converts the audio from the conversation into text-from-voice data 208.

A storage module 222 takes the text-from-voice data 208, or text data 204 from a conversation (e.g., from a chat), an encryption program 224 encrypts this data, and the encrypted data is stored in the conversation database 110. An indexer 226, a program in the storage module 222, indexes the data being stored and creates the data for the index 210. In some example embodiments, the index 210 is a data structure that improves the speed of data retrieval operations on a database table at the cost of additional writes and storage space to maintain the index data structure. Indexes are used to quickly locate data without having to search every record in a database every time a database is accessed.

The index 210 is then used to perform searches on the data. Without the index 210, searching for encrypted data would be almost impossible or require a large amount of computing resources.

When a search request 212 is received, the index 210 is searched at operation 214. For example, a search for "John" is received, and the index 210 identifies the one or more records in the conversation database 110 that contain the word "John." Once the data location 216 of the one or more records is identified, the corresponding data in the one or more records is decrypted 218. After the data is decrypted 218, the identified records are searched and the results 220 of the search are presented to the requester.

The person skilled in the art would readily appreciate that more complex requests may be processed (e.g., containing multiple words) and these complex requests are also processed utilizing the index 210, e.g., to identify the records that contain all the words in the request. By using the index 210, the system enables the user to quickly search through a large number of records containing conversation data.

In some implementations, the data from the index 210 is not encrypted (e.g., may include human-readable text); therefore, a malicious user having access to the index 210 may obtain information related to the conversation database 110, such as names of individuals, personal information, etc.

Figure 3:
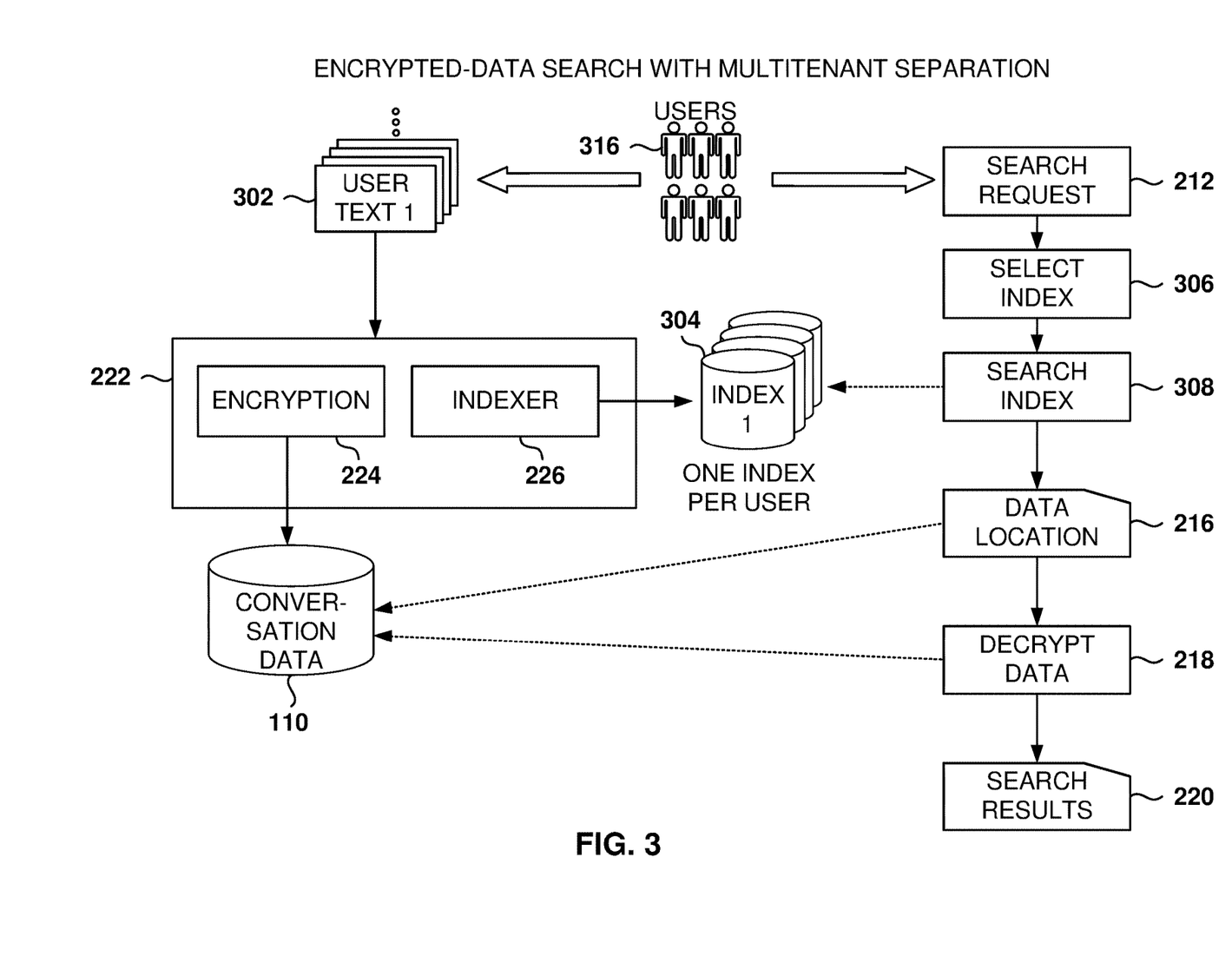
FIG. 3 illustrates the use of separate indexes for storing data, according to some example embodiments.

FIG. 3 illustrates the use of separate indexes for storing data, according to some example embodiments. To protect the data for each of the users 316 (e.g., each of the companies utilizing the communications service), a separate index 304 is maintained for each user. The index data for each user is kept in a separate addressable area within the disk 410 (FIG. 4), such as within a folder of a directory structure or a partition within the disk 410. This way, the data for the different users 316 is separated to minimize the risk of enabling one of the users to access the data from another user.

The process to index the data is the same as the one described above with reference to FIG. 2, except that the index data of each user 316 is kept in a separate index 304. It is noted that each user 316 represents a client of the communications service provider, and each user 316 is a separate account associated with one of the clients. Each search request 212 includes information about the account used to access the conversation data, e.g., user id for the account. When processing a search request 212, the index for the user 316 is selected at operation 306, and then the user's index 304 is used for the search request. Thus, for user 1, the data is stored in index 1 corresponding to user 1, and the search request from user 1 will utilize index 1.

Using separate indexes helps lower the risk of unauthorized data. However, there is still a risk that a user may gain access to the data in an unauthorized section of the conversation database 110 (e.g., due to a software bug, a user providing an incorrect address on disk). Note that the data for all the users is mingled in the conversation database 110. Here, if all users utilize the same encryption key for the conversation database (although a different encryption key for the index), a user could potentially decrypt the data of another user if the user gained access to the database.

Figure 4:
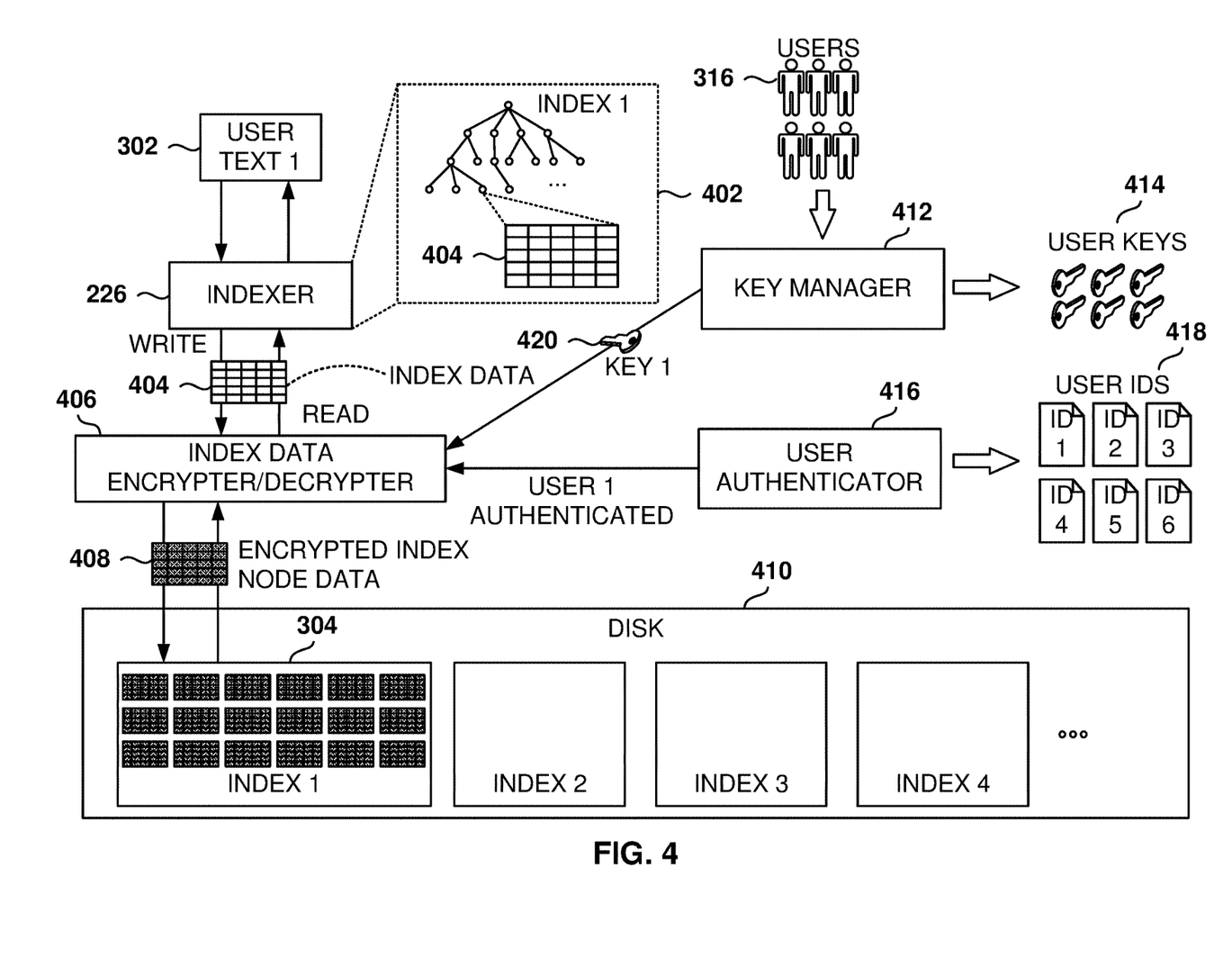
FIG. 4 illustrates the encryption of index data using per-customer encryption key, according to some example embodiments.

FIG. 4 illustrates the encryption of index data using a per-customer encryption key, according to some example embodiments. The illustrated example shows how the data for user 1 is indexed and stored on disk 410, according to some example embodiments.

As described above, the data 302 of user 1 is indexed by the indexer 226 during a write operation, which creates index data 404. In some example embodiments, each record of the database includes information about one conversation, such as the text of the conversation. The index data 404 includes information regarding indexed values (e.g., words in the text), and the index data 404 provides the location where the indexed value is found in the database, including the one or more records and the location within each record. The index may be organized in the form of a logical tree, and each word may correspond to one of the nodes in the tree. Other structures for the index may also be used.

During a write operation, the indexer 226 sends the data to be stored in disk 410. An index-data encrypter/decrypter 406 processes the write request and it appears to the indexer 226 as an interface to write the index data 404 to disk. In some example embodiments, the read and write requests from the indexer 226 are intercepted by the index-data encrypter/decrypter 406. The indexer 226 sends an address for storing/reading the data and the index-data encrypter/decrypter 406 determines which index 304 is associated with this call, and then which user is associated with the call.

Thus, the index-data encrypter/decrypter 406 may be utilized with any indexing tool because it is transparent to the program that performs the indexing.

In some example embodiments, the index data 404 is encrypted before being saved to disk 410. Additionally, the index data for each user 316 is kept in a separate structure within the disk 410, such as within a different directory of a file system. Therefore, the index data for the different users is separated in disk 410.

To encrypt the index data 404, each user 316 has a different key 414, which is different from the encryption key utilized to encrypt the conversation data. A key manager 412 manages the user keys 414. When a write operation is detected, the key manager 412 identifies the user associated with the write and retrieves the corresponding user key, such as key 420 for user 1.

Further, a user authenticator manages the authentication procedures for the users 316, which includes corresponding user IDs 418 and one or more validation methods (e.g., user password, double authentication).

During the write operation, the user authenticator 416 validates the user requesting the write operation. If the user is authenticated, then the write request may proceed, but if the user is not authenticated, the write operation is terminated (e.g., error message returned indicating write operation failed).

Thus, if the user is authenticated, the index-data encrypter/decrypter 406 receives the key 420 from the key manager 412 and uses this key to encrypt the index data 404, resulting in encrypted index node data 408, which is then stored in disk 410 within the section reserved for user 1.

The encrypted index node data 408 is not human-readable; therefore, if the wrong user would gain access to the area in disk 410 of another user, the wrong user would not be able to read the index data because the wrong user does not have access to the right encryption/decryption key 414.

Having separate index keys and authenticating the user generating the request provides two levels of added security to protect the index data 404 of the user.

During a read operation, the reverse takes place. As with the write, the user authenticator 416 validates the requester. Also, the key manager 412 provides the user key 420 to the index-data encrypter/decrypter 406. The index-data encrypter/decrypter 406 then decrypts the encrypted index node data 408 and returns the decrypted index data 404 to the indexer 226. Again, the authentication and encryption of the index data 404 is transparent to the indexer 226, appearing that the read request of the index data 404 returns the requested index data 404 in clear form.

The conversation data may include personal information, such as people's names and phone numbers. By encrypting the index data 404, the personal information is protected against unauthorized users that may read the disk 410 data.

Figure 5:
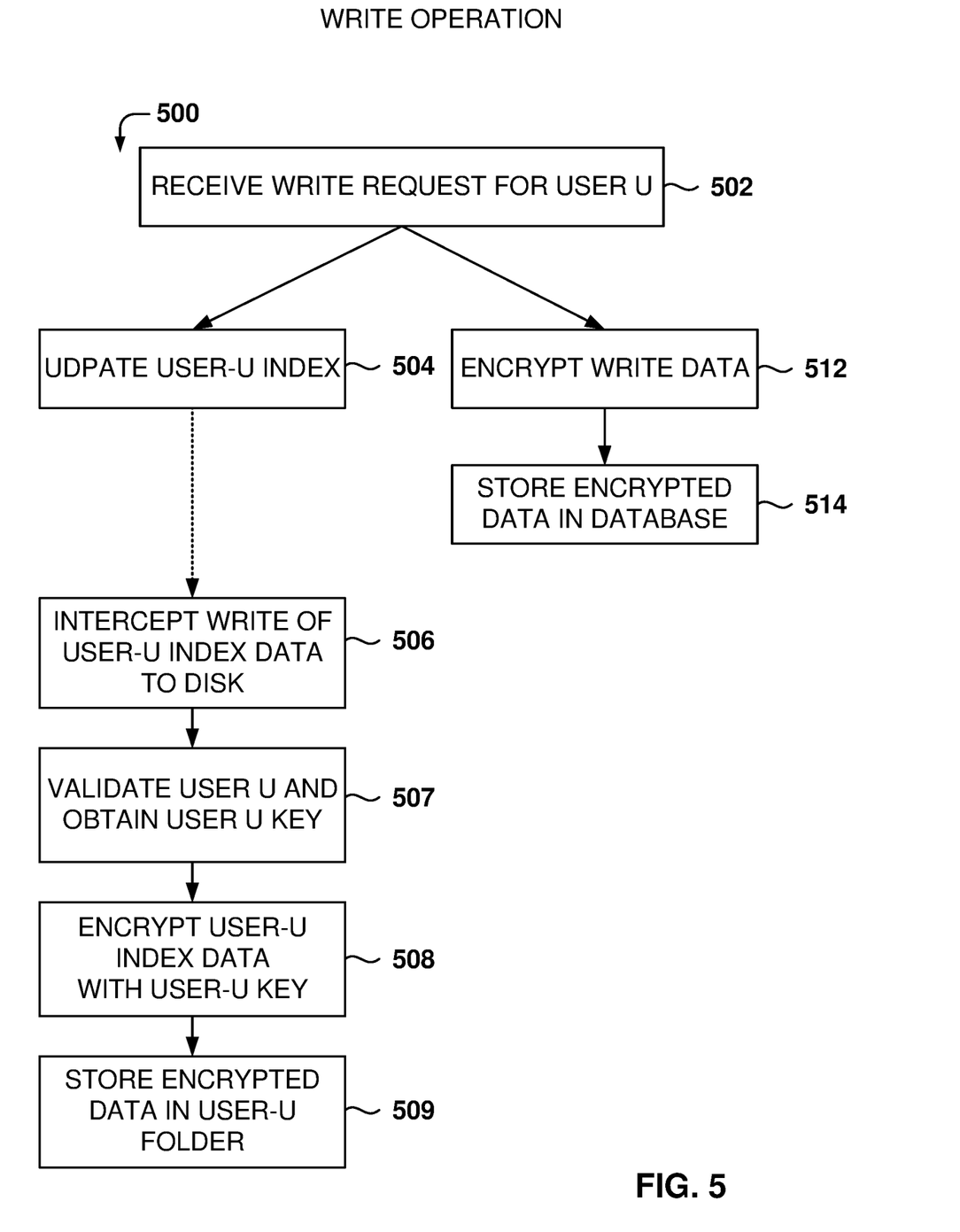
FIG. 5 is a flowchart of a method for processing a write request, according to some example embodiments.

FIG. 5 is a flowchart of a method 500 for processing a write request, according to some example embodiments. While the various operations in this flowchart are presented and described sequentially, one of ordinary skill will appreciate that some or all of the operations may be executed in a different order, be combined or omitted, or be executed in parallel.

At operation 502, a write request is received from a user U. From operation 502, the method 500 flows to operations 504 and 512. At operation 512, the write data associated with the write request is encrypted, and, at operation 514, the encrypted write data is stored in the database for storing user data.

At operation 504, the user-U index, for storing the user-U data, is updated based on the content of the write. For example, the write request is to store text data, and the text data is indexed and stored in user-U index.

At operation 506, the write request to disk, of the user-U index data, is intercepted, such as by a program to control the writing of index data to disk. In some example embodiments, the program that controls the writing of index data provides an interface to write data to disk, e.g., interface to a database.

At operation 507, the system validates that the user U is authenticated to perform the write operation. If the user is authenticated, the system gathers the encryption key used to encrypt user U's data, where each user utilizes a different encryption key to encrypt the index data. If the validation fails, then the operation 507 is terminated and an error code is returned. If the validation succeeds, the method 500 flows to operation 508, where the index data of user U is encrypted with user-U encryption key.

At operation 509, the encrypted data of user-U index is stored in a folder of a file system that is reserved for user U, or in some other data structure that is dedicated to storing the index data for the user U.

Figure 6:
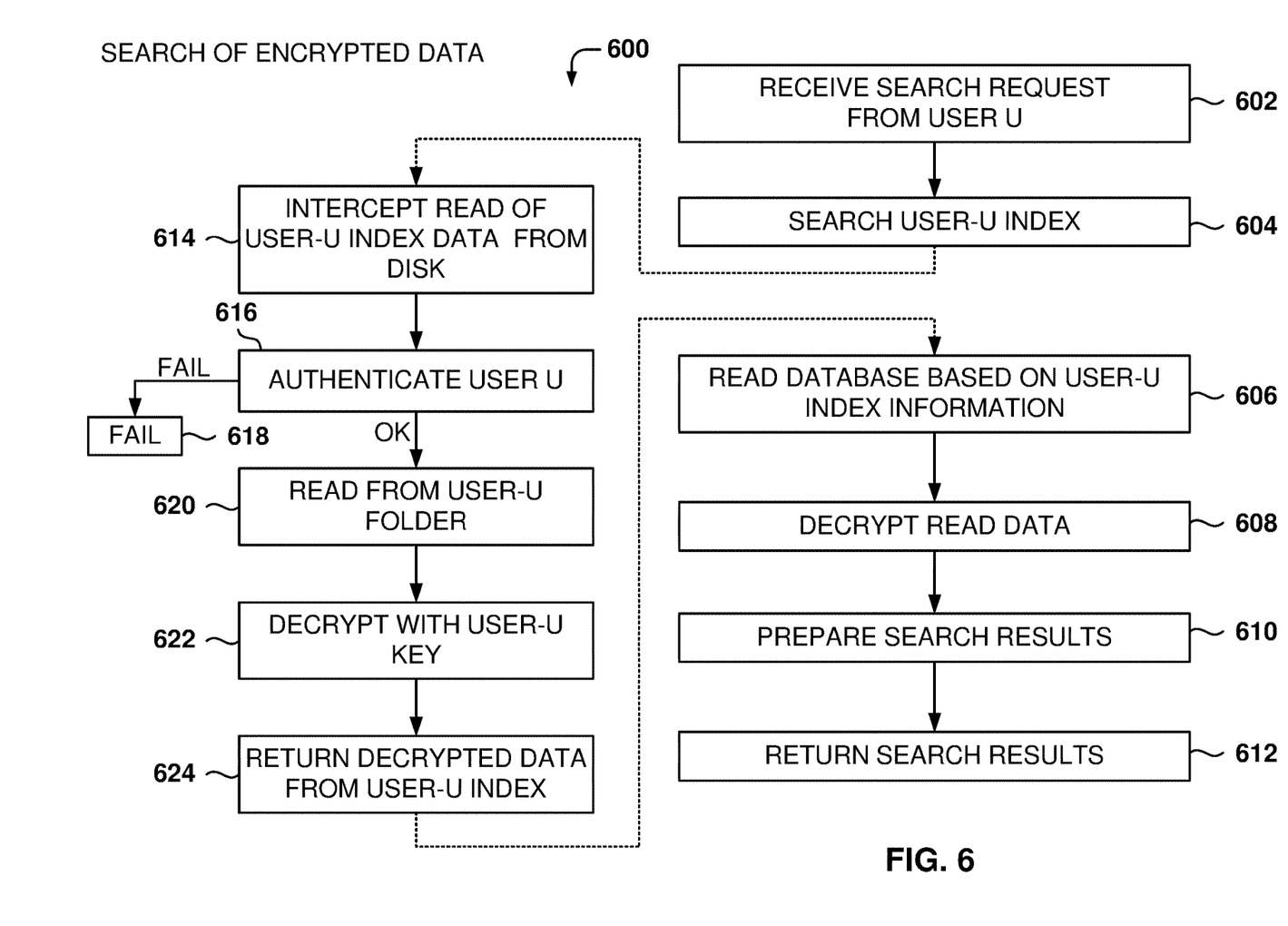
FIG. 6 is a flowchart of a method for processing a search request, according to some example embodiments.

FIG. 6 is a flowchart of a method 600 for processing a search request, according to some example embodiments. While the various operations in this flowchart are presented and described sequentially, one of ordinary skill will appreciate that some or all of the operations may be executed in a different order, be combined or omitted, or be executed in parallel.

At operation 602, a search request is received from user U, e.g., to find one or more words within a plurality of records that contain text. From operation 602, the method 600 flows to operation 604 where the index for user-U is searched.

At operation 614, a read request to the user-U index is intercepted by the program that manages the encryption and decryption of index data. At operation 616, the user U is authenticated to determine if the user U has access rights to the data. If the authentication fails, the search request fails at operation 618. If the authentication succeeds, the user-U key is obtained and the method 600 flows to operation 620, where the program reads the index data for user U from disk, such as from a folder holding user U's data.

At operation 622, the data read from disk in operation 620 is decrypted with the user-U key, and at operation 624, the decrypted data from user-U's index is returned.

At operation 606, the database containing the data for the search request is read based on the user-U's index information obtained at operation 624.

From operation 606, the method 600 flows to operation 608 were the data from the disk is decrypted. At operation 610, the search results are prepared based on the data read from the database. Further, at operation 612, the search results are returned in response to the search request.

Figure 7:
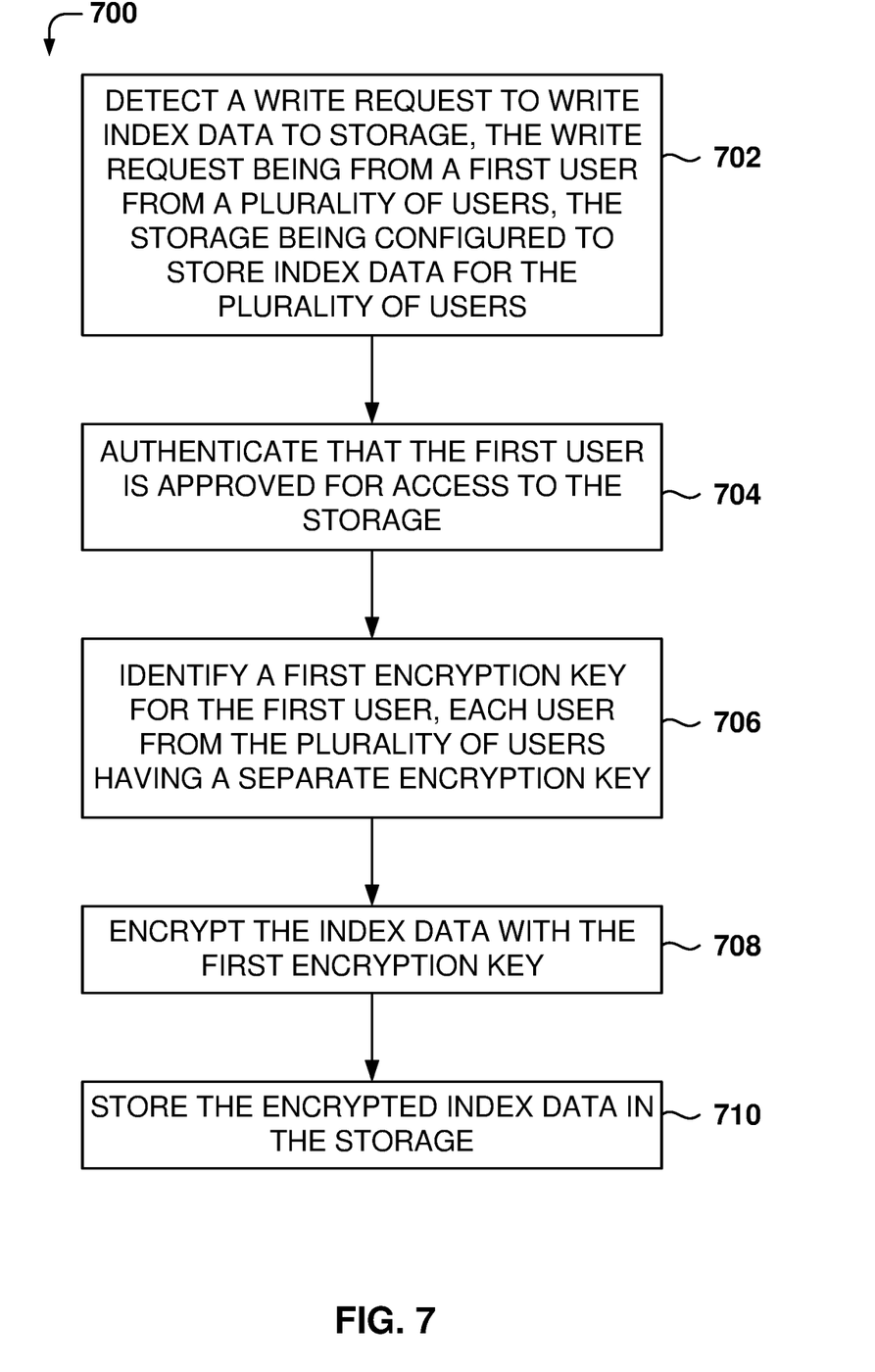
FIG. 7 is a flowchart of a method for secure data encryption in a multi-tenant service platform, according to some example embodiments.

FIG. 7 is a flowchart of a method 700 for secure data encryption in a multi-tenant service platform, according to some example embodiments. While the various operations in this flowchart are presented and described sequentially, one of ordinary skill will appreciate that some or all of the operations may be executed in a different order, be combined or omitted, or be executed in parallel.

At operation 702, one or more processors detect a write request to write index data to storage. The write request is from a first user from a plurality of users, and the storage is configured to store index data for the plurality of users.

From operation 702, the method 700 flows to operation 704, where the one or more processors authenticate that the first user is approved for access to the storage.

From operation 704, the method 700 flows to operation 706 to identify, by the one or more processors, a first encryption key for the first user, where each user from the plurality of users has a separate encryption key.

From operation 706, the method 700 flows to operation 708, where the one or more processors encrypt the index data with the first encryption key.

From operation 708, the method 700 flows to operation 710 for storing the encrypted index data in the storage.

In one example, the index data for each user from the plurality of users is stored in a separate addressable area within the storage.

In one example, the authenticating further comprises checking if the first user has appropriate credentials to process the write request, where an error condition is returned for the write request when the first user does not have the appropriate credentials.

In one example, identifying the first encryption key comprises selecting, by a key manager, the first encryption key that is associated with the first user from a plurality of encryption keys, wherein each user has a separate encryption key.

In one example, the method 700 further comprises: detecting a read request from the first user to read index data from the storage; authenticating that the first user is approved for access to the storage; identifying the first encryption key for the first user; reading from storage the index data associated with the read request; decrypting the read index data with the first encryption key; and returning the decrypted index data in response to the read request.

In one example, the index data is for a database where each record includes text.

In one example, index data is for indexing words in the records of the database.

Another general aspect is for a system that includes a memory comprising instructions and one or more computer processors. The instructions, when executed by the one or more computer processors, cause the one or more computer processors to perform operations comprising: detecting a write request to write index data to storage, the write request being from a first user from a plurality of users, the storage being configured to store index data for the plurality of users; authenticating that the first user is approved for access to the storage; identifying a first encryption key for the first user, each user from the plurality of users having a separate encryption key; encrypting the index data with the first encryption key; and storing the encrypted index data in the storage.

In yet another general aspect, a machine-readable storage medium (e.g., a non-transitory storage medium) includes instructions that, when executed by a machine, cause the machine to perform operations comprising: detecting a write request to write index data to storage, the write request being from a first user from a plurality of users, the storage being configured to store index data for the plurality of users; authenticating that the first user is approved for access to the storage; identifying a first encryption key for the first user, each user from the plurality of users having a separate encryption key; encrypting the index data with the first encryption key; and storing the encrypted index data in the storage.

Figure 8:
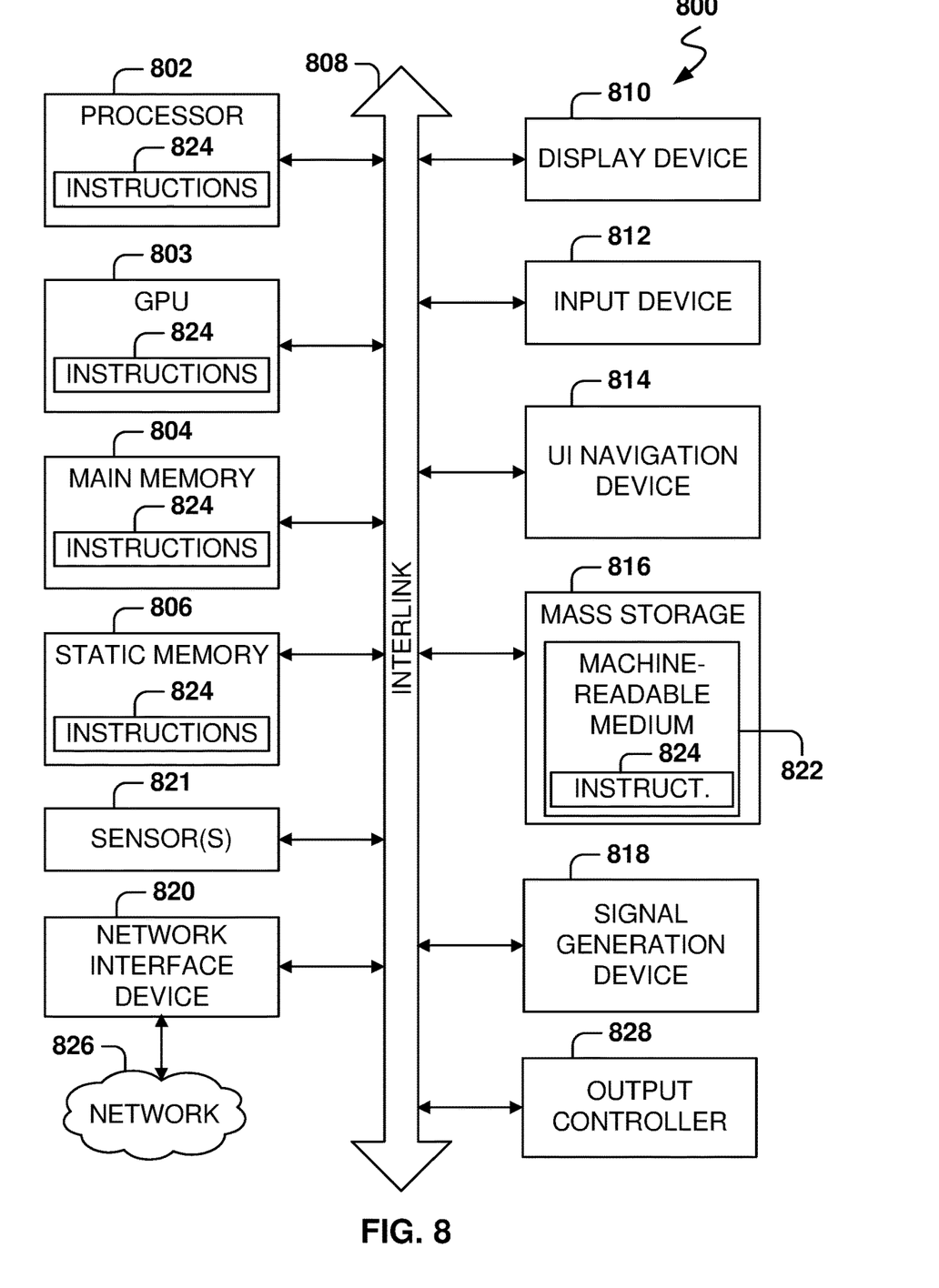
FIG. 8 is a block diagram illustrating an example of a machine upon or by which one or more example process embodiments described herein may be implemented or controlled.

FIG. 8 is a block diagram illustrating an example of a machine 800 upon or by which one or more example process embodiments described herein may be implemented or controlled. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in a peer-to-peer (P2P) (or other distributed) network environment. Further, while only a single machine 800 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 800 may include a hardware processor 802 (e.g., a central processing unit (CPU), a hardware processor core, or any combination thereof), a graphics processing unit (GPU) 803, a main memory 804, and a static memory 806, some or all of which may communicate with each other via an interlink (e.g., bus) 808. The machine 800 may further include a display device 810, an alphanumeric input device 812 (e.g., a keyboard), and a user interface (UI) navigation device 814 (e.g., a mouse). In an example, the display device 810, alphanumeric input device 812, and UI navigation device 814 may be a touch screen display. The machine 800 may additionally include a mass storage device (e.g., drive unit) 816, a signal generation device 818 (e.g., a speaker), a network interface device 820, and one or more sensors 821, such as a Global Positioning System (GPS) sensor, compass, accelerometer, or another sensor. The machine 800 may include an output controller 828, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, within the hardware processor 802, or within the GPU 803 during execution thereof by the machine 800. In an example, one or any combination of the hardware processor 802, the GPU 803, the main memory 804, the static memory 806, or the mass storage device 816 may constitute machine-readable media.

While the machine-readable medium 822 is illustrated as a single medium, the term "machine-readable medium" may include a single medium, or multiple media, (e.g., a centralized or distributed database, and/or associated caches and servers) configured to store the one or more instructions 824.

The term "machine-readable medium" may include any medium that is capable of storing, encoding, or carrying instructions 824 for execution by the machine 800 and that cause the machine 800 to perform any one or more of the techniques of the present disclosure, or that is capable of storing, encoding, or carrying data structures used by or associated with such instructions 824. Non-limiting machine-readable medium examples may include solid-state memories, and optical and magnetic media. In an example, a massed machine-readable medium comprises a machine-readable medium 822 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   encrypting, by one or more processors, text transcripts converted from audio data of conversations in which a plurality of users are participants, the text transcripts being encrypted with a text encryption key;
   detecting, by the one or more processors, a write request to write first index data that indexes first portions of the text transcripts to a corresponding first folder of a storage, the write request being from a first user from the plurality of users, the first portions of the text transcripts being indexed by the first index data and corresponding to the first user, the storage being configured to store index data for each of the plurality of users;
   authenticating, by the one or more processors, that the first user is approved for access to the storage;
   identifying, by the one or more processors, a first index encryption key that corresponds to the first user among a plurality of index encryption keys corresponding to the plurality of users, the first index encryption key being unique among the plurality of index encryption keys and distinct from the text encryption key with which the text transcripts are encrypted;
   encrypting, by the one or more processors, the first index data that indexes the first portions of the text transcripts and corresponds to the first user with the first index encryption key distinct from the text encryption key; and
   storing the encrypted first index data of the first user in the corresponding first folder of the storage.

2. The method as recited in claim 1, wherein the authenticating further comprises:
   checking if the first user has appropriate credentials to process the write request, wherein an error condition is returned for the write request when the first user does not have the appropriate credentials.

3. The method as recited in claim 1, wherein the identifying of the first index encryption key comprises:
   selecting the first index encryption key corresponding to the first user from the plurality of index encryption keys, wherein each user of the plurality of users has a unique index encryption key among the plurality of encryption keys.

4. The method as recited in claim 1, further comprising:
   detecting a read request from the first user to read the first index data from the storage;
   authenticating that the first user is approved for access to the storage;
   identifying the first index encryption key for the first user;
   reading from the storage the first index data associated with the read request;
   decrypting the first index data with the first index encryption key; and returning the decrypted first index data in response to the read request.

5. The method as recited in claim 1, wherein the storing of the encrypted first index data in the corresponding first folder of the storage includes storing the encrypted first index data in a corresponding first partition of the storage, the first partition corresponding to the first user.

6. A system comprising:
a memory comprising instructions; and
one or more computer processors, wherein the instructions, when executed by the one or more computer processors, cause the system to perform operations comprising:
encrypting text transcripts converted from audio data of conversations in which a plurality of users are participants, the text transcripts being encrypted with a text encryption key;
detecting a write request to write first index data that indexes first portions of the text transcripts to a corresponding first folder of a storage, the write request being from a first user from the plurality of users, the first portions of the text transcripts being indexed by the first index data and corresponding to the first user, the storage being configured to store index data for each of the plurality of users;
authenticating that the first user is approved for access to the storage;
identifying a first index encryption key that corresponds to the first user among a plurality of index encryption keys corresponding to the plurality of users, the first index encryption key being unique among the plurality of encryption keys and distinct from the text encryption key with which the text transcripts are encrypted;
encrypting the first index data that indexes the first portions of the text transcripts and corresponds to the first user with the first index encryption key distinct from the text encryption key; and
storing the encrypted first index data of the first user in the corresponding first folder of the storage.

7. The system as recited in claim 6, wherein the authenticating further comprises:
checking if the first user has appropriate credentials to process the write request, wherein an error condition is returned for the write request when the first user does not have the appropriate credentials.

8. The system as recited in claim 6, wherein the identifying of the first index encryption key comprises:
selecting the first index encryption key corresponding to the first user from the plurality of index encryption keys, wherein each user of the plurality of users has a unique index encryption key among the plurality of index encryption keys.

9. The system as recited in claim 6, wherein operations further comprise:
detecting a read request from the first user to read the first index data from the storage;
authenticating that the first user is approved for access to the storage;
identifying the first index encryption key for the first user;
reading from the storage the first index data associated with the read request;
decrypting the first index data with the first index encryption key; and
returning the decrypted first index data in response to the read request.

10. The system as recited in claim 6, wherein the storing of the encrypted first index data in the corresponding first folder of the storage includes storing the encrypted first index data in a corresponding first partition of the storage, the first partition corresponding to the first user.

11. A non-transitory machine-readable storage medium including instructions that, when executed by a machine, cause the machine to perform operations comprising:
encrypting text transcripts converted from audio data of conversations in which a plurality of users are participants, the text transcripts being encrypted with a text encryption key;
detecting a write request to write first index data that indexes first portions of the text transcripts to a corresponding first folder of a storage, the write request being from a first user from the plurality of users, the first portions of the text transcripts being indexed by the first index data and corresponding to the first user, the storage being configured to store index data for each of the plurality of users;
authenticating that the first user is approved for access to the storage;
identifying a first index encryption key that corresponds to the first user among a plurality of index encryption keys corresponding to the plurality of users, the first index encryption key being unique among the plurality of index encryption keys and distinct from the text encryption key with which the text transcripts are encrypted;
encrypting the first index data that indexes the first portions of the text transcripts and corresponds to the first user with the first index encryption key distinct from the text encryption key; and
storing the encrypted first index data of the first user in the corresponding first folder of the storage.

12. The non-transitory machine-readable storage medium as recited in claim 11, wherein the authenticating further comprises:
checking if the first user has appropriate credentials to process the write request, wherein an error condition is returned for the write request when the first user does not have the appropriate credentials.

13. The non-transitory machine-readable storage medium as recited in claim 11, wherein the identifying of the first encryption key comprises:
selecting the first index encryption key corresponding to the first user from the plurality of index encryption keys, wherein each user of the plurality of users has a unique index encryption key among the plurality of index encryption keys.

14. The non-transitory machine-readable storage medium as recited in claim 11, wherein the operations further comprise:
detecting a read request from the first user to read the first index data from the storage;
authenticating that the first user is approved for access to the storage;
identifying the first index encryption key for the first user;
reading from the storage the first index data associated with the read request;
decrypting the first index data with the first index encryption key; and
returning the decrypted first index data in response to the read request.

15. The non-transitory machine-readable storage medium as recited in claim 11, wherein the storing of the encrypted first index data in the corresponding first folder of the storage includes storing the encrypted first index data in a corresponding first partition of the storage, the first partition corresponding to the first user.

\* \* \* \* \*

UNITED STATES PATENT AND TRADEMARK OFFICE
CERTIFICATE OF CORRECTION

PATENT NO. : 11,714,911 B2
APPLICATION NO. : 17/114318
DATED : August 1, 2023
INVENTOR(S) : Swenson et al.

It is certified that error appears in the above-identified patent and that said Letters Patent is hereby corrected as shown below:

On the Title Page

On page 2, in Column 1, under "Other Publications", Line 11, delete "Mlultiple" and insert --Multiple-- therefor Signed and Sealed this
Twelfth Day of November, 2024

Katherine Kelly Vidal
*Director of the United States Patent and Trademark Office*